Jan. 24, 1939.  E. P. KNIESCHE  2,144,845
CHECK LINK CONSTRUCTION
Filed Jan. 8, 1937
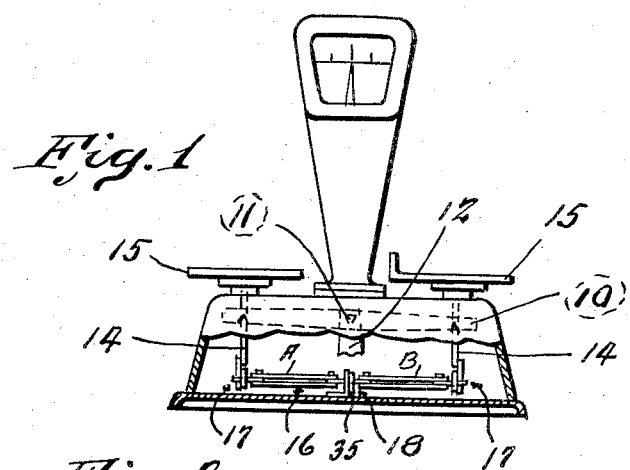
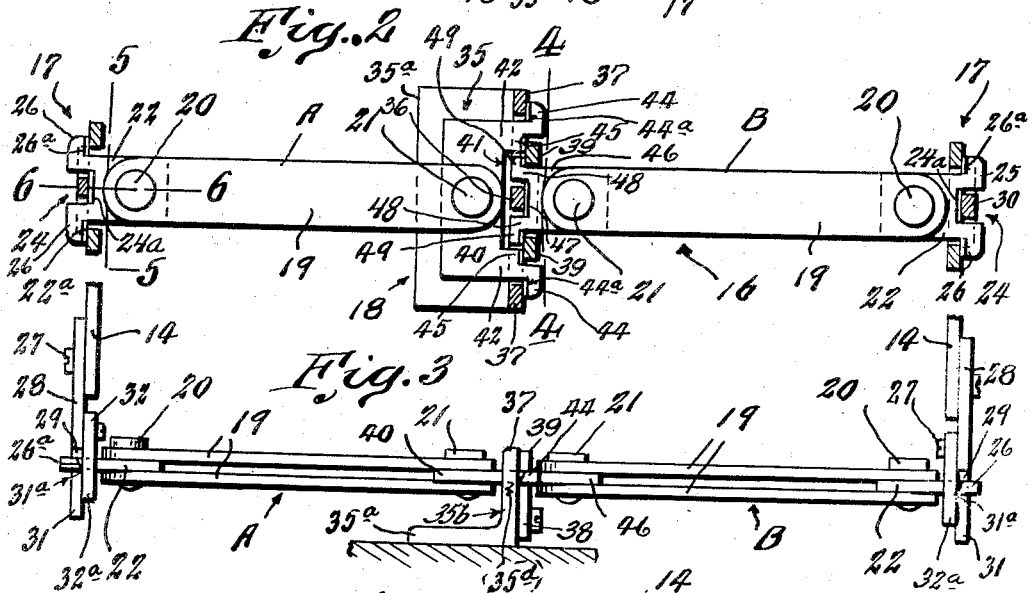
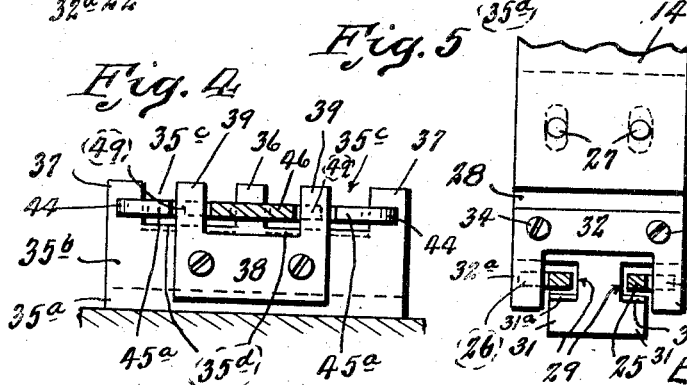
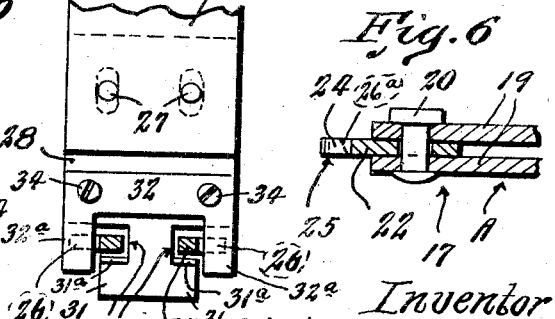
Inventor
Edwin P. Kniesche
By William James
Atty.

UNITED STATES PATENT OFFICE 2,144,845

CHECK LINK CONSTRUCTION

Edwin P. Kniesche, St. Louis, Mo., assignor to Schaper Scale Company, St. Louis, Mo., a corporation of Missouri Application January 8, 1937, Serial No. 119,542

3 Claims. (Cl. 265—27)

This invention relates to weighing scales and more particularly to check link construction for counter weighing scales.

In the construction of weighing scales having one or more platters, such as are used, for example, in stores, it is customary to use a check link to maintain the platters and their supports in vertical positions at all times. Where a scale with two platters is used, the check link has its ends pivotally connected to the lower ends of the platter supports and is fulcrumed below and in a vertical plane with the fulcrum of the scale beam. Thus a parallelogram is formed and the platter supports occupy vertical positions at all times. Formerly the check link consisted generally of a single piece member having a pin fulcrum and having pin pivotal connections with the platter supports.

The object of the present invention is to provide a check link consisting of two bars fixed in spaced-apart relation with each other by means of pins or rivets near their ends and having a knife edge fulcrum member pivotally mounted on one end and extending longitudinally from between said bars for engaging a fixed fulcrum member and having a knife edge member pivotally mounted on the other pin between said bars and extending in opposite directions for engaging a bearing member fixed to the lower end of a platter support.

Another object of the invention is to provide a check link construction employing knife edge pivot members which do not have to be accurately aligned with each other and which do not impair the accuracy of the scale.

Another object of the invention is to provide a check link construction, the parts of which can be economically manufactured and assembled together and which can be easily installed in a scale without requiring exact and accurate alignment of the check link pivot members with each other.

With these and other objects in view, my invention consists in certain novel features of construction and arrangement of parts, hereinafter more fully described and claimed, and illustrated in the accompanying drawing, in which—

Figure 1 is a side elevational view of a scale equipped with my improved check link.

Figure 2 is an enlarged top plan view of my improved check link with parts in cross section.

Figure 3 is a side elevational view of same.

Figure 4 is a vertical cross section taken on line 4—4 of Figure 2.

Figure 5 is a vertical cross section taken on line 5—5 of Figure 2.

Figure 6 is an enlarged vertical cross section taken on line 6—6 of Figure 2.

Referring by numerals to the accompanying drawing, 10 indicates a scale beam fulcrumed at 11 on an upstanding bracket or support 12, which latter is fixed to a base of the scale. Pivotally mounted at each end of the scale beam 10 is a support 14, the upper end of each of which carries a platter 15. One of the platters receives the load or commodity to be weighed while the other receives a weight.

The lower end of each support 12 extends a suitable distance below the scale beam 10 and has pivotally connected thereto the corresponding end of a check link 16 as indicated at 17. The check link is disposed parallel with and below the scale beam 10 and is fulcrumed at 18 in a vertical plane with the fulcrum of the scale beam.

The check link consists of two sections A and B. Each section comprises a pair of spaced-apart bars 19 which are rectangular in cross section and are secured together at their outer ends by rivets or pins 20 and at their inner ends by rivets or pins 21. The outer end of each section A and B has pivotally mounted on its pin 20 between the inner ends of bars 19 a horizontally disposed knife edge member 22.

Each knife edge member 22 is formed at its outer end with a centrally disposed outwardly opening notch 24, thereby providing a pair of extensions 25, each of which is formed with a lateral projection 26. The inwardly presented edges of lateral projections 26 are inclined from vertical to provide knife edges 26a and the outwardly presented edge of each notch 24 is also inclined from vertical to provide a knife edge 24a. It will be noted that these knife edges 24a and 26a are disposed on a common horizontal axis.

The lower end of each platter support 14 has fixed thereto by means of screws 27 a vertically disposed plate 28. The upper end of this plate is formed with two elongated slots for receiving said screws so that said plate can be adjusted in a vertical plane relatively to said support.

The lower end of the plate 28 is formed on each side with a horizontally and laterally opening notch 29, thereby forming a centrally and downwardly extending portion 30, the lower end of which has formed on each side a lateral projection 31. The upper edge of each of these projections is formed with a knife edge, as indicated at 31a. A plate 32 is removably secured to the inner side of the lower end of plate 28 by screws 34. This plate 32 has at each side a downward extension 32a which projects slightly below the corresponding knife edge 31a.

When the parts are assembled, the portion 30 of plate 28 occupies the notch 24 of the knife edge member 22 and the extensions 25 rest on the upwardly presented knife edges 31a of projections 31. The lateral projections 26 of member 22 are arranged past the downward extensions 32a and the knife edges 26a of said projections bear against the corresponding face of said extensions 32a. Thus the knife edges 31a pivotally support the outer end of each check link section in the corresponding platter support and the knife edges 26a pivotally engage the downward extensions 32a.

The pins or rivets 20 permit angular movement of the members 22 with respect to sections A and B so as to preserve perfect alignment between said members 22 and the plates 28 and 32 and prevent binding.

The inner ends of sections A and B have each a pivotal mounting on a bracket or fulcrum member 35. This member comprises a horizontal flange 35a which is fixed to the base of the scale and a vertical flange 35b which extends upwardly and has its outer face disposed in a vertical plane with the fulcrum of the scale beam. This vertical flange 35b is cut away to form a pair of upwardly opening notches 35c and a central extension 36 and a pair of side upward extensions 37. A plate 38 is fixed to the outer face of flange 35b and is provided at each end with an upward extension 39 which is spaced from the central extension 36 and the corresponding extension 37.

Section A has pivotally mounted on its rivet 21 between the inner ends of bars 19 a horizontally disposed plate or knife edge member 40. This member is cut away at its outer end to provide a central comparatively large notch 41 and side extensions 42. Each extension is formed with a lateral projection 44 extending outwardly and with a shoulder 45 presented inwardly. The opposed edges of each projection 44 and shoulder 45 are aligned with each other and with those of the other side of plate 40 and are cut inclined from vertical to provide knife edges 44a and 45a, respectively. When the section A is in place the knife edges 44a bear against the outer faces of end extensions 37 and the knife edges 45a bear against the opposed faces of extensions 39. Thus the section A has a knife edge engagement on both sides of the fulcrum and is held against movement in a horizontal plane in either direction. The bottoms of notches 35c are cut inclined from horizontal, as indicated at 35d, to provide knife edge bearings for the undersides of the extensions 42.

The section B is provided on its inner end with a horizontally disposed knife edge member 46 which is pivotally mounted on the corresponding pin 21 between the inner ends of bars 19. This plate 46 is similar in shape to end plates 22 having a central notch 47 and projections 48 terminating in lateral extensions 49. The notch 47 provides clearance for the central extension 36 of fulcrum member 35 and the lateral projections 48 bear against the inner faces of extensions 39 of plate 38. The aligned edges of the extensions 49 and of the notch 47 are inclined from vertical to present knife edges to their respective bearing faces.

Thus by virtue of the fact that each knife edge member is mounted on the respective ends of bars 19 for pivotal movement on a vertical axis said knife edge members and their counterparts do not have to be in perfect alignment with each other and a slight variation to their true positions will not produce binding and impair the accuracy of the scale. This construction also effects a great saving in time and labor in assembling the scale.

By using a pair of spaced apart bars 19 for the sections A and B it is not necessary to use great care in setting the rivets or pins 20 and 21 in position as the knife edge members being mounted between the bars exert a straight pull on the bars and there is no tendency to twist the bars or the knife edge members as would be the case if only one bar was used for each section and the knife edge members were disposed to one side thereof. Thus the pins 20 and 21 can be slightly out of vertical plane or the knife edge members slightly out of horizontal plane without impairing the operation of the check link mechanism. Furthermore, each pin 20 and 21 is anchored at both ends and the strain is applied to the middle thereof so that there is no danger of bending or throwing the pin out of its true position as is the case with a single bar construction where the pin is anchored at one end only and the stress applied to the other end.

While I have shown and described herein the preferred form of my invention, it is to be understood that various changes in the construction and arrangement of parts of my improved link can be made and substituted for those herein disclosed without departing from the spirit of my invention.

I claim:

1. In a device of the class described, in combination, a scale beam, a fulcrum therefor, a platter support pivotally mounted on one end of said scale beam and extending therebelow, and having a plurality of opposed vertical bearing faces, a fixed fulcrum member arranged below said beam in a transverse vertical plane with the fulcrum thereof, said fulcrum member having a plurality of vertically disposed opposed bearing faces, a pair of horizontally disposed vertically spaced-apart check links disposed below said beam, a vertically disposed pin fixed to and extending between each pair of ends of said check links, and a horizontally disposed knife-edge plate pivotally mounted on each pin between the corresponding ends of said links and extending outwardly in a plane parallel to said links, one of said plates having its knife-edges arranged in opposed relation to each other for engaging the opposed bearing faces of said fulcrum member and the other plate having its knife edges arranged in opposed relation to each other engaging the opposed bearing faces of said platter support, each of said knife-edge plates being pivotally movable in a horizontal plane about the axis of its corresponding pin, the knife edges of each plate being disposed in the horizontal plane with said plate and in opposed relation with each other to permit push and pull engagement between each plate and the vertical bearing faces of the corresponding fulcrum member or the platter supports.

2. In a device of the class described, in combination a scale beam, a platter support pivotally mounted on each end of said scale beam and extending therebelow, a plurality of vertically disposed opposed bearing faces on the lower end of each platter support, a fulcrum member fixed below said scale beam, a plurality of vertically disposed opposed bearing faces on said fulcrum member, a pair of horizontally disposed vertically spaced links arranged to each side of said fulcrum member, a horizontally disposed plate pivotally mounted between the inner ends of each pair of links, a plurality of opposed knife edges on each plate for engaging certain of the bearing faces of said fulcrum member, a horizontally disposed plate pivotally mounted between the outer ends of each pair of links, a plurality of opposed knife edges formed on each plate for engaging the opposed vertical faces of the corresponding platter support, the knife edges of all of said plates being disposed in the same horizontal plane with each other and with each plate.

3. A check link for weighing scales comprising in combination a fulcrum member adapted to be fixed below a scale beam, a plurality of vertically disposed opposed bearing faces on said fulcrum member, a pair of horizontally disposed vertically spaced links arranged to each side of said fulcrum member, a horizontally disposed plate pivotally mounted between the inner ends of each pair of links, a plurality of transversely and horizontally disposed knife edges arranged in opposed relation on each plate and engaging certain of the bearing faces of said fulcrum member, a horizontally disposed plate pivotally mounted between the outer ends of each pair of links, a plurality of horizontally and transversely disposed opposed knife edges arranged on each of said last mentioned plates, and a plurality of vertically disposed opposed bearing faces adapted to be attached to the lower end of each platter support and engaged by the knife edges of the corresponding outer plate, said plates and the knife edges thereof being all disposed in the same horizontal plane with each other.

EDWIN P. KNIESCHE.